United States Patent
Allensworth et al.

(10) Patent No.: US 7,172,447 B2
(45) Date of Patent: Feb. 6, 2007

(54) SUBSEA GANG CONNECTOR SYSTEM

(75) Inventors: David Carter Allensworth, Pearland, TX (US); Timothy William Crown, Cypress, TX (US)

(73) Assignee: Oceanworks International, Inc., Houston, TX (US)

( * ) Notice: Subject to any disclaimer, the term of this patent is extended or adjusted under 35 U.S.C. 154(b) by 0 days.

(21) Appl. No.: 11/243,535

(22) Filed: Oct. 5, 2005

(65) Prior Publication Data
US 2006/0079107 A1 Apr. 13, 2006

Related U.S. Application Data

(60) Provisional application No. 60/616,803, filed on Oct. 7, 2004.

(51) Int. Cl.
*H01R 13/52* (2006.01)
(52) U.S. Cl. ..................................................... 439/271
(58) Field of Classification Search ................ 439/352, 439/362, 953, 559, 587, 577, 595, 274, 680
See application file for complete search history.

(56) References Cited

U.S. PATENT DOCUMENTS

| | | | |
|---|---|---|---|
| 4,362,413 A | 12/1982 | Heard et al. | 403/14 |
| 5,794,701 A | 8/1998 | Cunningham et al. | 166/341 |
| 5,803,763 A * | 9/1998 | Grant | 439/364 |
| 6,116,942 A * | 9/2000 | Chen et al. | 439/362 |
| 6,183,296 B1 * | 2/2001 | Pacini et al. | 439/577 |
| 2001/0034153 A1 | 10/2001 | McIntosh et al. | 439/364 |
| 2002/0116776 A1 | 8/2002 | Stracke et al. | |
| 2004/0127084 A1 | 7/2004 | Glennie et al. | 439/316 |

OTHER PUBLICATIONS

Duco, Inc., Drawing and Specifications for Construction of Surface Termination, May 25, 1999.

* cited by examiner

*Primary Examiner*—J. F. Duverne
(74) *Attorney, Agent, or Firm*—Elizabeth R. Hall

(57) ABSTRACT

A subsea connector system is used to connect internally mounted couplers to provide sealed conduits for subsea operations. The system has a removable (outboard) connector and a fixed (inboard) connector each with a housing having special geometric properties that facilitate alignment and connection of the couplers. The latching mechanism has a latch pin in the fixed connector and a latch sleeve in the removable connector for receiving and latching to the latch pin. The couplers (male and female) and the latching mechanism are located within the housings of the fixed and removable connectors to provide protection for the components from damage during storage, handling, transport and installation operations.

17 Claims, 13 Drawing Sheets

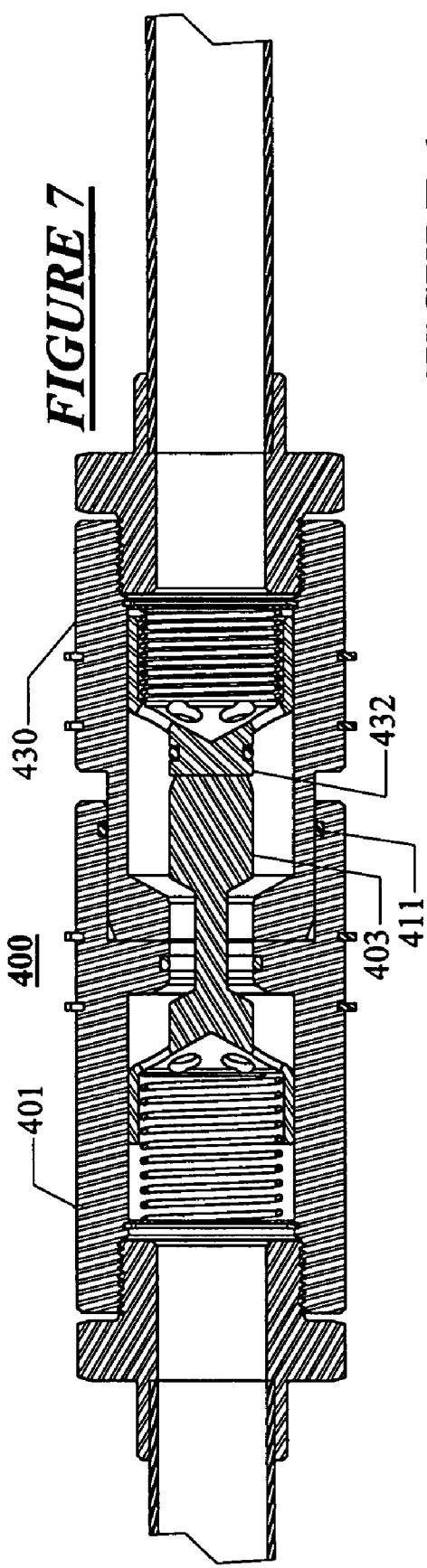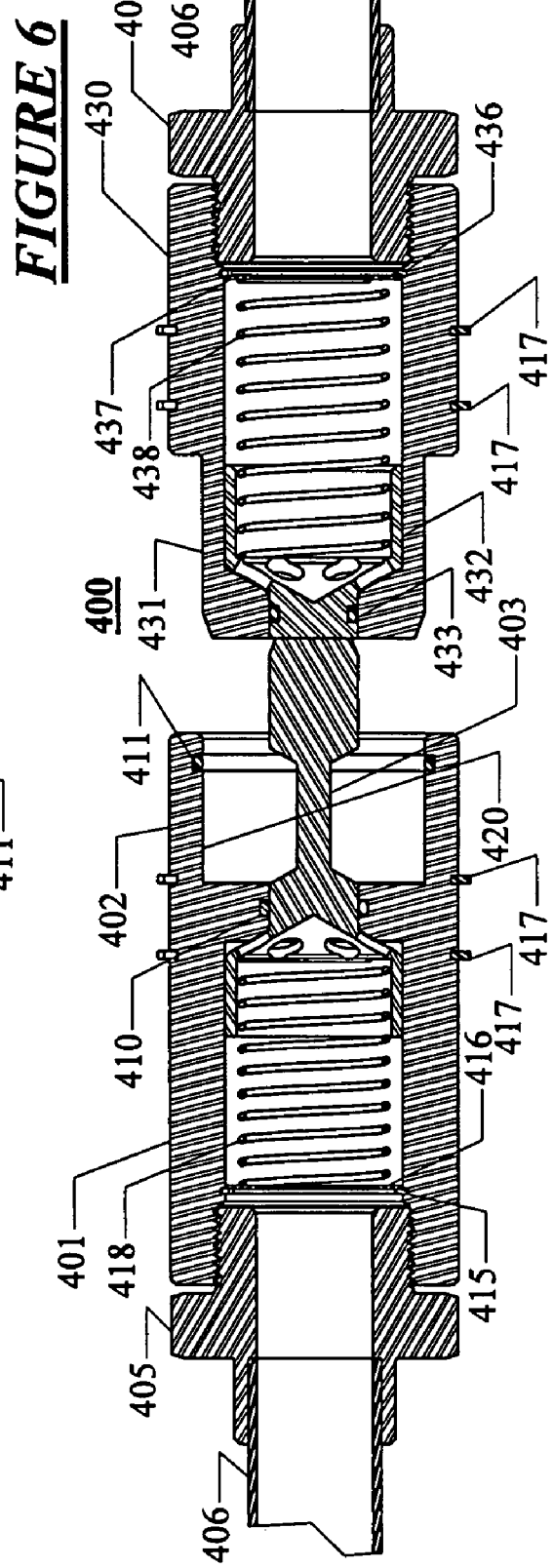

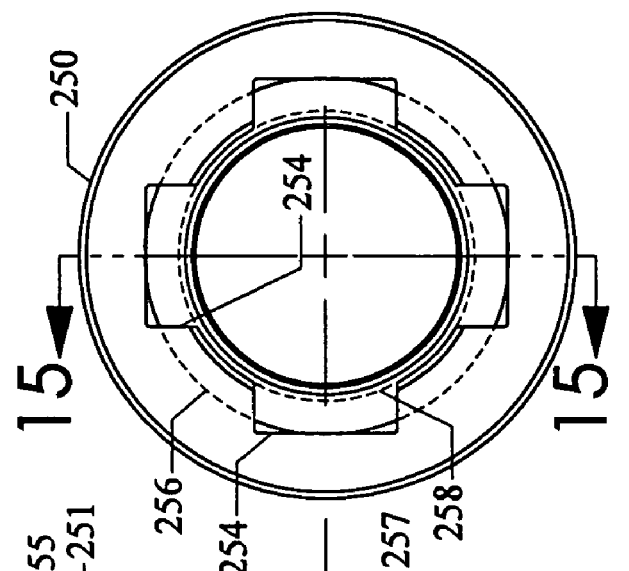
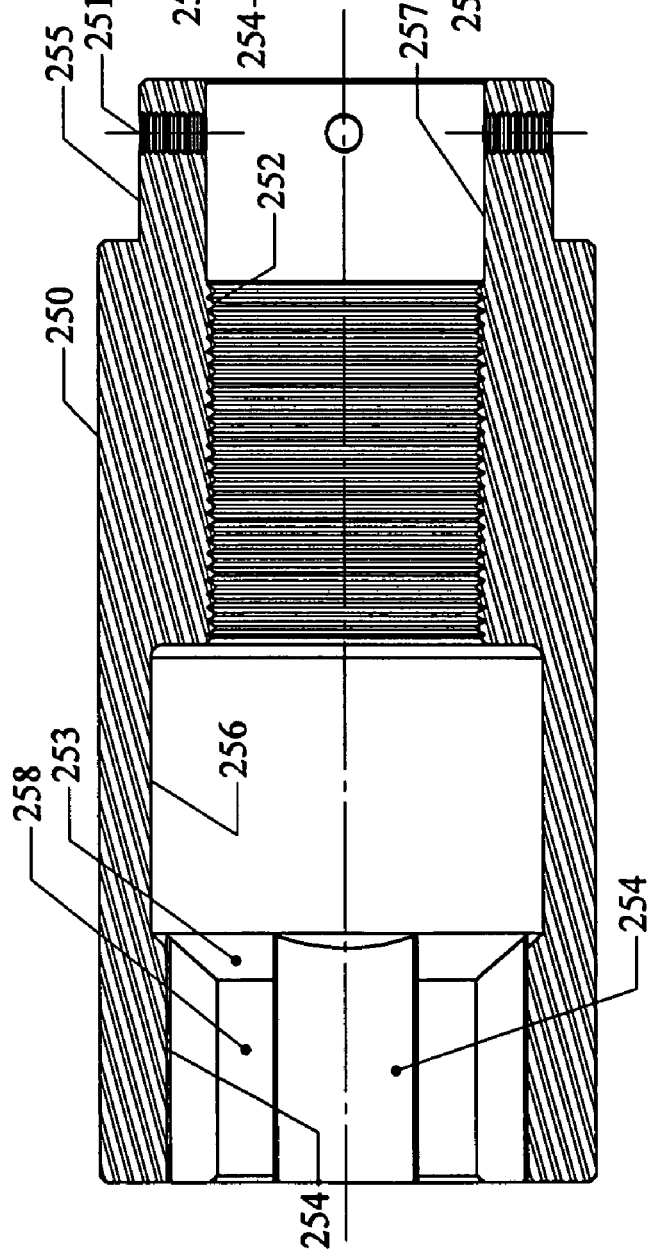

SUBSEA GANG CONNECTOR SYSTEM

CROSS REFERENCE TO RELATED APPLICATIONS

The present application, pursuant to 35 U.S.C. 111(b), claims the benefit of the filing date of provisional application Ser. No. 60/616,803 filed Oct. 7, 2004, and entitled "Subsea Connector."

BACKGROUND OF THE INVENTION

1. Field of the Invention

The present invention relates in general to a method and apparatus for making secure a hydraulic gang connector in remote or hazardous locations. More particularly, the invention relates to a method and apparatus for the simultaneous connection and disconnection of multiple male and female couplers to provide sealed conduits for subsea operations.

2. Description of the Related Art

Subsea oil and gas production equipment that requires the use of external signals or the supply of fluids for operation is normally connected subsea after installation with interconnecting cables, jumpers, or umbilicals having removable connectors on each end. Remotely Operated Vehicles ("ROVs") are normally used to connect the removable (outboard) connector to the fixed (inboard) connector on the subsea equipment. Due to operational conditions (such as ROV size and strength, weight of connectors, ocean currents and drag induced by pulling the cables across the seafloor), proper alignment of the removable and fixed connectors can be difficult and time consuming, and improper alignment can damage the components of the fixed and/or removable connectors.

There are three important aspects of connector design: alignment, latching and protection of components. The first requirement (alignment) is to get the fixed and removable connectors aligned quickly and accurately. The second requirement (latching) is to latch the fixed and removable connectors together such that they form a watertight seal with each other. The third requirement (protection) is to protect tubing and other components during storage, handling, transport and installation operations.

There are many alignment schemes currently used in subsea operations. A typical method is to insert a stepped pin into a cylinder having a leading chamfer. As the pin enters the cylindrical receptacle at some entry angle, the pin generates a force that causes it to align with the receptacle. Two pins are required to get alignment in two planes.

Another alignment method used is a cylinder with a symmetrical, outwardly expanding internal notch having 180 degree helical sides extending to its opening end such that a comating pin having a complementary radially outwardly projecting helix, round pin, or other protrusion may be inserted. Engagement of the female helical surface with the male helical surface, the pin, or the can provide up to 180 degrees of rotational alignment in either direction, but the mechanism is long and requires a high axial force to achieve alignment.

There are also many latching methods in use for securing the removable connector to the fixed connector. The removable connector is normally carried and installed by the ROV with the use of an industry standard torque tool and a flying lead orientation tool ("FLOT"). The usage of the torque tool as a standard practice requires the connector designs to include some kind of threads. The earliest methods relied on remotely engaging a male and female thread subsea and required much care not to cross-thread the connection. Cross-threading usually requires retrieval of the subsea equipment to repair the damaged thread on the fixed connector.

A preferred latching method is to use permanently engaged threads on the removable connector with a latching profile that engages the fixed connector. One type of profile currently used is a collet latching onto a fixed hub. This is a common method for making large diameter connections for use in pipelines and wellheads. This concept is compact and works well to pull the halves together but when the operation takes place in deep water where the force to separate the plates is large, the fingers of the collet are susceptible to buckling. The override of this type of connector requires the use of a hydraulic ram to pull a sleeve that captures the collet back thus releasing the collet.

In 1982, Exxon patented (U.S. Pat. No. 4,362,413) a method in which the threads are permanently engaged. This method relied on inserting a nut with an external profile into a receptacle and turning the nut 90 degrees until a mechanical stop prevented the nut from rotating any further and restrained the nut axially. A disadvantage to this concept is that the size of the receptacle used in the connector relative to the thread size is not very efficient for designs concerned with size and weight.

Two other concepts that are similar to the Exxon patent are the Oceaneering patent by Cunningham (U.S. Pat. No. 5,794,701) and the pending Subsea 7 patent by Glennie (U.S. patent application Ser. No. 10/477,088) that is in Re-Examination. The Oceaneering patent discloses a specific configuration of components based on the engagement of a receptacle on the fixed connector and a stud with lugs or profiles on the removable connector. The Subsea 7 patent application is based on the same concept but also covers an override feature utilizing shear pins.

A similar latching mechanism is also used by Intec Engineering, which is based on the Retlock concept acquired from Fuel Subsea. The Intec Engineering system is the DMAC or Diverless Maintained Cluster that is also marketed by Subsea 7.

Bayonet-type latching systems have the latch pin mounted on the face of the removable connector and the latch sleeve mounted in the fixed connector. This design leaves the latch pin exposed to damage from storage, handling, transport and installation of the removable connector.

All of the above-described designs leave the tubing exposed to damage from handling and ROV operations, are susceptible to thread damage and are difficult to align, thereby increasing the probability of damaged tubing or other components during installation.

There exists a need for an apparatus and method that provides both a coarse alignment and a fine alignment that is easy and quick to execute.

There is a further need to provide a connector with an apparatus and method of latching the parts of the connector together without the need for engaging threads subsea.

Furthermore, a need exists for providing a connector design that provides the desired alignment and latching characteristics, while providing a protection mechanism for the tubing, latching system and other components of the subsea connector system.

SUMMARY OF THE INVENTION

The present invention relates in general to a method and apparatus for making secure connections in remote or hazardous locations. More particularly, the invention relates to a method and apparatus for the connection of male and female gang couplers to provide sealed conduits for subsea operations.

One aspect of the present invention is a selectably engagable and disengagable subsea connector system for mating a plurality of mutually comateable male and female couplers located within fixed and removable connectors of a subsea connector system to provide a plurality of sealed conduits. The removable connector has a housing connected to a transverse end plate. The female couplers are mounted on and extend outwardly from the removable end plate. The fixed connector has a housing connected to a second transverse end plate. The male couplers extend inwardly from the fixed end plate. The removable housing and the fixed housing have similar geometric properties such that they are mutually engagable and thereby assist the alignment of the removable connector within the fixed connector to facilitate the subsea engagement of the plurality of male and female couplers to form a plurality of sealed conduits.

Another aspect of the present invention is a subsea connector system comprising: (a) a first connector having a first housing connected to a first end plate, wherein a first set of couplers are mounted on the first end plate; (b) a second connector having a second housing connected to a second end plate, wherein a second set of couplers, comateable with the first set of couplers, are mounted on the second end plate; and (c) a latching system including a latch sleeve having a plurality of female splines attached to the first connector, and a latch pin having a plurality of male splines attached to the second connector; wherein the interaction of the latch sleeve and the latch pin induce the engagement of the first and second connectors.

Yet another aspect of the present invention is a connector system comprising: (a) a first connector having a first housing connected to a first end plate, wherein a first set of couplers are mounted on the first end plate; (b) a second connector having a second housing connected to a second end plate, wherein a second set of couplers, comateable with the first set of couplers, are mounted on the second end plate; and (c) a latching system including (i) a latch pin attached to the second connector having a plurality of male splines positioned on a proximal end of the latch pin, wherein the male splines extend a spline length, a cylindrical shaft positioned on a distal end of the latch pin, wherein the shaft has a diameter smaller than the external diameter of the male splines and a shaft length that is longer than the spline length, and a set of latch pin shoulders wherein each latch pin shoulder transitions from one male spline to the cylindrical shaft, and (ii) a latch sleeve attached to the first connector having a plurality of female splines positioned on a proximal end of the latch sleeve, wherein the female splines have a length similar to the spline length of the male splines and are coengageable with the male splines of the latch pin, a cylindrical counterbore positioned on a distal end of the latch sleeve, the counterbore having a diameter larger than the external diameter of the male splines and a counterbore length longer than the spline length, wherein the counterbore has a threaded segment at a counterbore distal end, and a set of latch sleeve shoulders comateable with the latch pin shoulders, wherein each latch sleeve shoulder transitions from one female spline to the counterbore, and (iii) a camming mechanism comprising a camming sleeve with a helical slot and a cojoined second slot parallel to a camming sleeve axis and a stationary pin mounted on the first connector; wherein the interaction of the latch sleeve and the latch pin induce the engagement of the first and second connectors.

Still yet another aspect of the present invention is a method for engaging subsea connectors comprising the steps of: (a) obtaining a subsea connector system comprising: a first connector having a first housing connected to a first end plate, wherein a first set of couplers are mounted on the first end plate; a second connector having a second housing connected to a second end plate, wherein a second set of couplers, comateable with the first set of couplers, are mounted on the second end plate; and a latching system including (i) a latch pin attached to the second connector having a plurality of male splines positioned on a proximal end of the latch pin, wherein the male splines extend a spline length, a cylindrical shaft positioned on a distal end of the latch pin, wherein the shaft has a diameter smaller than the external diameter of the male splines and a shaft length that is longer than the spline length, and a set of latch pin shoulders wherein each latch pin shoulder transitions from one male spline to the cylindrical shaft, and (ii) a latch sleeve attached to the first connector having a plurality of female splines positioned on a proximal end of the latch sleeve, wherein the female splines have a length similar to the spline length of the male splines and are coengageable with the male splines of the latch pin, a cylindrical counterbore positioned on a distal end of the latch sleeve, the counterbore having a diameter larger than the external diameter of the male splines and a counterbore length longer than the spline length, wherein the counterbore has a threaded segment at a counterbore distal end, and a set of latch sleeve shoulders comateable with the latch pin shoulders, wherein each latch sleeve shoulder transitions from one female spline to the counterbore; (b) aligning the male and female splines such that an axial translatory movement of the latch sleeve relative to the latch pin causes the male and female splines to initially engage; (c) moving the aligned latch sleeve and latch pin together such that the male splines move into the counterbore of the latch sleeve and the female splines are adjacent the cylindrical shaft of the latch pin; and (d) rotating the latch sleeve relative to the latch pin such that the male and female splines are misaligned and the shoulders of the latch pin abut the shoulders of the sleeve.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 is a longitudinal cross-sectional view of the male and female sides of a hydraulic coupling that are initially engaged.

FIG. 7 is a longitudinal cross-sectional view of the male and female sides of the hydraulic coupling of FIG. 6 that are fully engaged.

FIG. 14 is an axial end view of the latching sleeve from the end that is entered by the latch pin during stabbing.

FIG. 15 is a longitudinal cross-sectional view of the latch sleeve taken along line 15—15 of FIG. 14.

DESCRIPTION OF THE PREFERRED EMBODIMENTS

The present invention provides a rapid, reliable and accurate process for remotely making secure hydraulic gang connections in difficult environments and under hazardous conditions.

Figure 1:
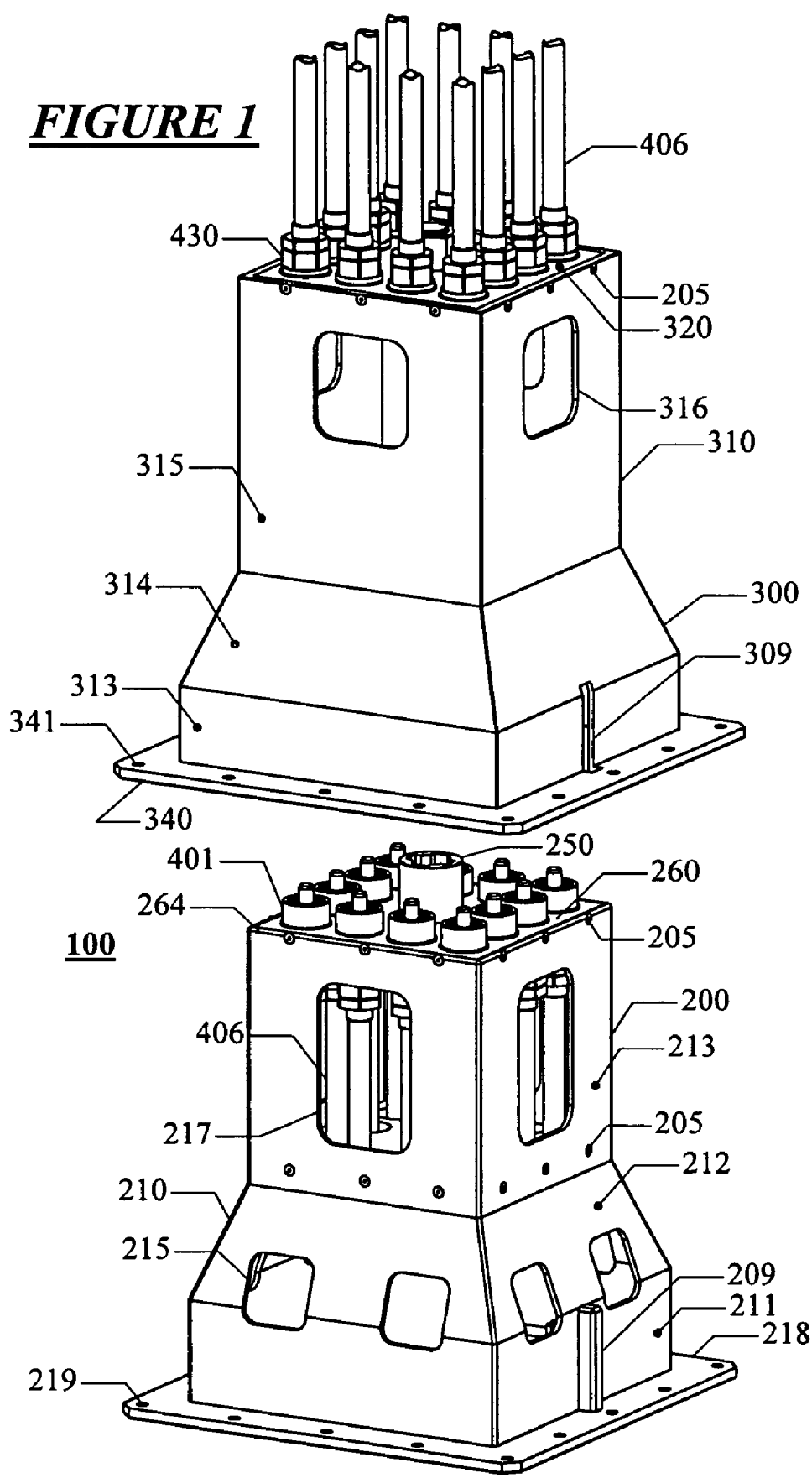
FIG. 1 is an oblique view of the removable and the fixed connectors as they are roughly aligned to initiate the connection process.

As shown in FIG. 1, one preferred embodiment of the present invention is a subsea connector system 100 used for subsea connection of removable and fixed-mounted couplings for hydraulics, as shown herein, but also for electrical lines, fiber optics, process fluids and other components that require sealed conduits.

The subsea connector system 100 consists of two major components: a removable (outboard) connector 200 and a fixed (inboard) connector 300 that can be connected to each other in any orientation. The subsea connector system 100 is especially applicable for use with stiff cables and bundles of tubes that are difficult to align subsea with ROVs.

For ease of understanding, all examples and drawings assume a vertical orientation with the fixed connector the upper connector. The above-described use and orientation are meant by way of example and are not intended to limit the scope of the invention. The system also can be used for connecting a removable outboard connector and a removable inboard connector (not shown). Typically, the components of the connector system 100 are preferably made of carbon or stainless steel for the structural parts and rubber such as Viton™ or nitrile for the elastomeric seals.

Removable (Outboard) and Fixed (Inboard) Housings

Figure 2:
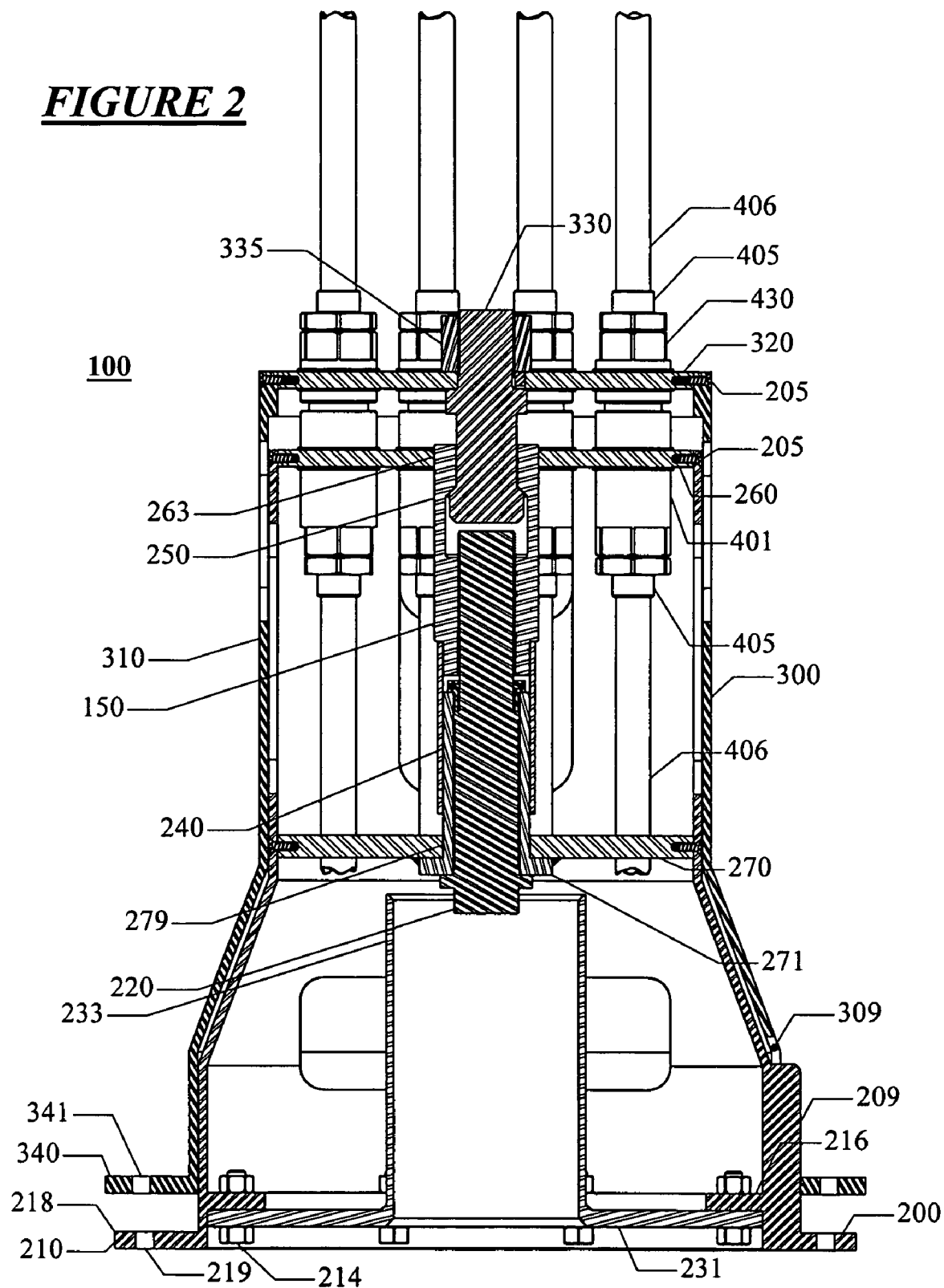
FIG. 2 is a longitudinal cross-sectional view of the fully connected removable and fixed connectors.

FIGS. 1 and 2 illustrate the overall geometry of the removable and fixed connectors 200 and 300, respectively, that provides novel alignment characteristics for the subsea connector system 100. An outboard (removable) connector housing 210 is symmetrical about its two principle perpendicular planes and includes a larger square cross-section tube 211, a smaller square tube 213, and a square cross-section truncated reducing pyramidal tube 212 interconnecting the tubes 211 and 213 so that the resultant tubular structure has the same wall thickness throughout smoothly interconnecting adjoining surfaces 211, 212, and 213.

The sections of the removable connector housing 210 are all coaxial. The exterior horizontal edges of the top of the smaller tube 213 are liberally rounded with radius 264 to ease misaligned stabbing of the removable connector 200 into the interior of fixed connector 300.

At the lower end of the removable connector housing is located a symmetrical externally projecting transverse end flange 218 of constant width which has a regularly spaced pattern of mounting bolt holes 219 parallel to the axis of symmetry of the housing 210. The removable connector housing 210 also has a symmetrical inwardly projecting transverse interior flange 216 of constant width for the mounting of a tool guide 230 positioned upwardly from the lower end of the housing 210. The interior flange 216 has a regularly spaced pattern of mounting bolt holes parallel to the axis of symmetry of the housing 210.

Spaced slightly below its upper end in smaller tube 213, housing 210 has a regular pattern of multiple countersunk holes for flathead screws 205 normal to its axis of symmetry. Removable connector housing 210 houses symmetrical removable transverse end plate 260 with a slip fit at its upper end. Flathead screws 205 engaged through the countersunk hole pattern and engaged in the tapped holes 265 of transverse end plate 260 serve to rigidly mount that plate.

Spaced downwardly from the upper end of housing 210 and slightly above the lower end of the smaller square tube 213 is a second pattern of countersunk holes for flathead screws identical to the pattern at the upper end of the housing. Interior of this portion of smaller tube 213, square latch assembly mounting plate 270 is mounted transversely to the axis of housing 210 by means of a set of screws 205 engaged the second pattern of countersunk holes and the threaded mounting holes 275 in plate 270.

FIG. 1 illustrates the various access apertures in the housing 210 of the removable connector 200. Access apertures in the removable housing 210 include two sets of rectangular coupler access holes: lower 215 and upper 217. These access holes 215 and 217 are symmetrically placed in each side of the removable housing 210. The upper access apertures 217 are also used to access the latching mechanism. Additionally, there is an alignment key 209 provided on a vertical plane of symmetry on one side of larger tube 211. One embodiment of the alignment key 209 has a rectangular cross-section, external bevels on its upper end, and is mounted to tube 211 by welding. The lower end of key 209 abuts the upper side of mounting flange 218.

Tool guide 230 consists of a transverse square mounting plate 231 that has a centrally located vertical right circular cylindrical guide sleeve 233 extending upwardly. A through hole matching the inner diameter of the guide sleeve 233 is cut in the middle of the mounting plate 231. The inner diameter of the guide sleeve 233 offers a close slip fit to the end of a commercially available wrenching device inserted from below (not shown), so that the wrenching device can be maintained concentric with the vertical axis of the tool guide and hence with the axis of symmetry of the removable connector 200. This concentricity eases the engagement of the wrenching device with the square profile wrench flats 221 on the bottom end of the drive screw 220 of the removable side latching components 151. Mounting plate 231 also has a regular pattern of peripheral bolt holes corresponding to the mounting holes in the interiorly extending flange 216 of removable housing 210, thereby permitting the tool guide 230 to be mounted on the lower side of flange 216 by bolt and nut sets 214.

In the event that a wrenching device requiring torque reaction points is to be employed to effect the operation of the latching system 150, such as a ROV torque tool, the upper end of the tool guide 230 can be modified. In such a case, the upper end of tool guide 230 is provided with an integral transverse upper end diaphragm having a central hole to permit extension therethrough of the wrenching socket of the wrenching device. Two diametrically opposed equidiameter reaction pin through holes parallel to and equally offset from the central hole axis of the diaphragm are then provided in order to engage corresponding pins mounted on the end of the ROV torque tool (not shown).

As seen in FIGS. 1 and 2, the fixed connector housing 310 of fixed connector 300 is structurally similar to removable connector housing 210, but it is made slightly larger so that it has a slip fit over the exterior of housing 210. Fixed connector housing 310 is symmetrical about its two principal perpendicular planes and includes a larger square cross-section tube 313, a smaller square tube 315 and a square cross-section truncated reducing pyramidal tube 314 interconnecting the tubes 313 and 315 so that the resultant tubular structure has the same wall thickness throughout smoothly interconnecting adjoining surfaces 313, 314, and 315 except at the top of housing 310. The sections of the fixed connector housing 310 are all coaxial.

At the lower end of the fixed connector housing 310 is located a symmetrical externally projecting transverse end flange 340 of constant width which has a regularly spaced pattern of mounting bolt holes 341 parallel to the axis of symmetry of the housing 310. Adjacent the top of housing 310, the wall thickness of small tube 315 is locally increased to the inside so that it offers a slip fit to the transverse sides of the fixed end plate 320. This is done so that the size of the squares of the fixed and removable end plates 320 and 260, respectively, is the same.

Spaced slightly below its upper end in smaller tube 315, housing 310 has a regular pattern of multiple countersunk holes for flathead screws 205 normal to its axis of symmetry. Fixed connector housing 310 houses symmetrical square fixed transverse end plate 320 with a slip fit at its upper end. Flathead screws 205 engaged through the countersunk hole pattern and engaged in the tapped holes 325 of transverse fixed end plate 320 serve to rigidly mount that plate. FIG. 1 illustrates the symmetrically placed rectangular access apertures 316 in each face of smaller tube 315 of the housing 310 of the fixed connector 300. The access apertures 316 are used to access the latching mechanism and the male hydraulic couplings 430. Apertures 316 in the fixed housing 310 also provide an outlet for seawater, as the removable connector 200 is inserted further into the fixed connector 300.

Additionally, there is an alignment slot 309 provided on a vertical plane of symmetry on one side of larger tube 313. Slot 309 has a rectangular cross-section, external bevels on its lower end, and is cut into tube 313. The lower end of slot 309 penetrates the mounting flange 340. Slot 309 is engageable with key 209 and together the interaction of the two when the removable 200 and fixed 300 connectors are assembled together axially ensures that the connectors are properly engaged.

Male and Female Coupling Sets 400

Illustrated in FIGS. 6 and 7 are male and female couplings 430 and 401, which together constitute a latchless quick connect coupling system 400. Such quick connect couplings are commercially available for use in externally latched gang connections. The Staubli Corporation and others offer typical examples of such commercial products. Female coupling 401 has a body 402 composed of right circular cylindrical tubular sections.

The cylindrical exterior of body 402 of female coupling 401 has, from its upper sealing engagement first end (shown on the righthand side in FIGS. 6 and 7) two snap ring grooves that are spaced apart sufficiently to admit end plate 260 of removable connector 200 and, at its lower end, a symmetrical hexagonal pattern of wrench flats. External snap rings 417 are engageable in the snap ring grooves to retain female coupling 401 in mounting holes of end plate 260. The interior of body 402 has, from its first end, a counterbore 420 with a female O-ring groove containing O-ring 411, a through bore with a female O-ring groove containing O-ring 410, a frustroconical abutting surface to limiting coupling poppet travel, and a downwardly opening counterbore with a snap ring groove containing internal snap ring 415 and, finally, a female sealing thread.

Brazeable tube fitting 405 is threadedly engaged and seals into the female thread at the lower end of female coupling 401. The exterior of brazeable connector 405 has, from its upper end, a male sealing thread, a symmetrical hexagonal transverse flange which provides wrenching flats, and a reduced diameter neck. The connector 405 has a concentric through bore with a downwardly opening counterbore that is a close fit to hydraulic tube 406. Brazeable connector 405 and hydraulic tube 406 are typically assembled by brazing. However, compression fittings can alternatively be used for the interconnection of connector 405 and tube 406.

Female poppet 403 is symmetrical about its vertical axis and in mounted in the interior of body 402 so that its upward end projects above the upper end of body 402. The exterior of poppet 403 has, from its upper end, a first cylindrical contact section, a reduced diameter extension neck, an enlarged sealing cylinder, an enlarged frustroconical abutment shoulder, and a main cylindrical body section. The first cylindrical contact section is a slip fit through the main bore of the body 402, while the sealing cylinder section is a slip fit to the main bore of the body 402 and is sealed against O-ring 410 when the two are adjacent. The lower end of the poppet 403 is a slip fit to the lower counterbore of the body 402. The lower end of poppet 403 is bored with a conical bore end so that the wall thickness of poppet 403 at the abutment shoulder is relative thin. Multiple flow passages with their axes inclined to and intercepting the poppet longitudinal axis provide a flow path between the interior and exterior of the poppet.

A flat washer 416 is a close fit to the lower counterbore of body 402 and abuts the upper side of snap ring 415. Compression spring 418 abuts both the upper side of washer 416 and the interior shoulder of the bore of poppet 403, thereby biasing poppet 403 against the downwardly facing abutting surface of body 402.

The body 431 of male coupling 430 is composed of right circular cylindrical tubular sections. The cylindrical exterior of body 431 has, from its lower sealing engagement first end (shown on the lefthand side in FIGS. 6 and 7) a large bevel for easing sealing engagement with O-ring 411, a reduced diameter sealing surface which is a slip fit into the female socket 420 of body 402 and sealable against O-ring 411, an enlarged main cylindrical body section having two snap ring grooves which are spaced apart sufficiently to admit end plate 320 of fixed connector 300 and, at its upper end, a symmetrical hexagonal pattern of wrench flats.

External snap rings 417 are engageable in the snap ring grooves to retain male coupling 430 in mounting holes 322 of end plate 320. The interior of body 431 has, from its lower end, a through bore through which the contact end of poppet 403 of the female connector 401 can pass, a frustroconical abutting surface to limiting coupling poppet travel, and a upwardly opening counterbore with a snap ring groove containing internal snap ring 436 and, finally, a female sealing thread. Another brazeable tube fitting 405 with attached hydraulic tubing 406 is sealing engaged in the female thread at the upper end of body 431.

Male connector poppet 432 has, from its lower end, a sealing cylindrical section with a centrally located male O-ring groove containing O-ring 433, an enlarged frustroconical abutting shoulder, and a cylindrical upper section. The sealing cylindrical contact section is a slip fit through the main bore of the body 431 and is sealed against O-ring 433 when the two are adjacent. The upper end of the poppet 432 is a slip fit to the counterbore of the body 431. Similarly to poppet 403 of the female coupling 401, poppet 432 has a coaxial bore with a conical bore end on its upper end and extending sufficiently far into the body of poppet 432 that the wall of the poppet is relatively thin in the region of its abutting shoulder. Multiple flow passages with their axes inclined to and intercepting the poppet longitudinal axis provide a flow path between the interior and exterior of the poppet 432. A flat washer 437 is a close fit to the upper counterbore of body 431 and abuts the upper side of snap ring 436. Compression spring 438 abuts both the upper side of washer 436 and the interior shoulder of the bore of poppet 432, thereby biasing poppet 432 against the upwardly facing abutting surface of body 431.

FIG. 2 is a vertical longitudinal cross-sectional view of the fully mated removable connector 200 and fixed connector 300. FIG. 2 illustrates the geometry of the removable housing 210 and the fixed housing 310, along with their internally mounted components of the latching system 150. The components of the latching system 150 are grouped into removable side latching components 151 and fixed side latching components 152. The removable side latching components 151, shown most clearly in FIGS. 3 and 9, along with the exploded FIG. 12, include a latch assembly mounting plate 270, a drive screw 220, a camming sleeve 240, the latch sleeve 250 and female couplers 401 mounted on the removable end plate 260. The components of the fixed side latching components 152, shown best in FIGS. 3 and 9 and exploded FIG. 8, include fixed end plate 320, latch pin 330, latch pin hex nut 335, and key 339, along with male couplings 430.

Removable Side Latching Components 151

Figure 3:
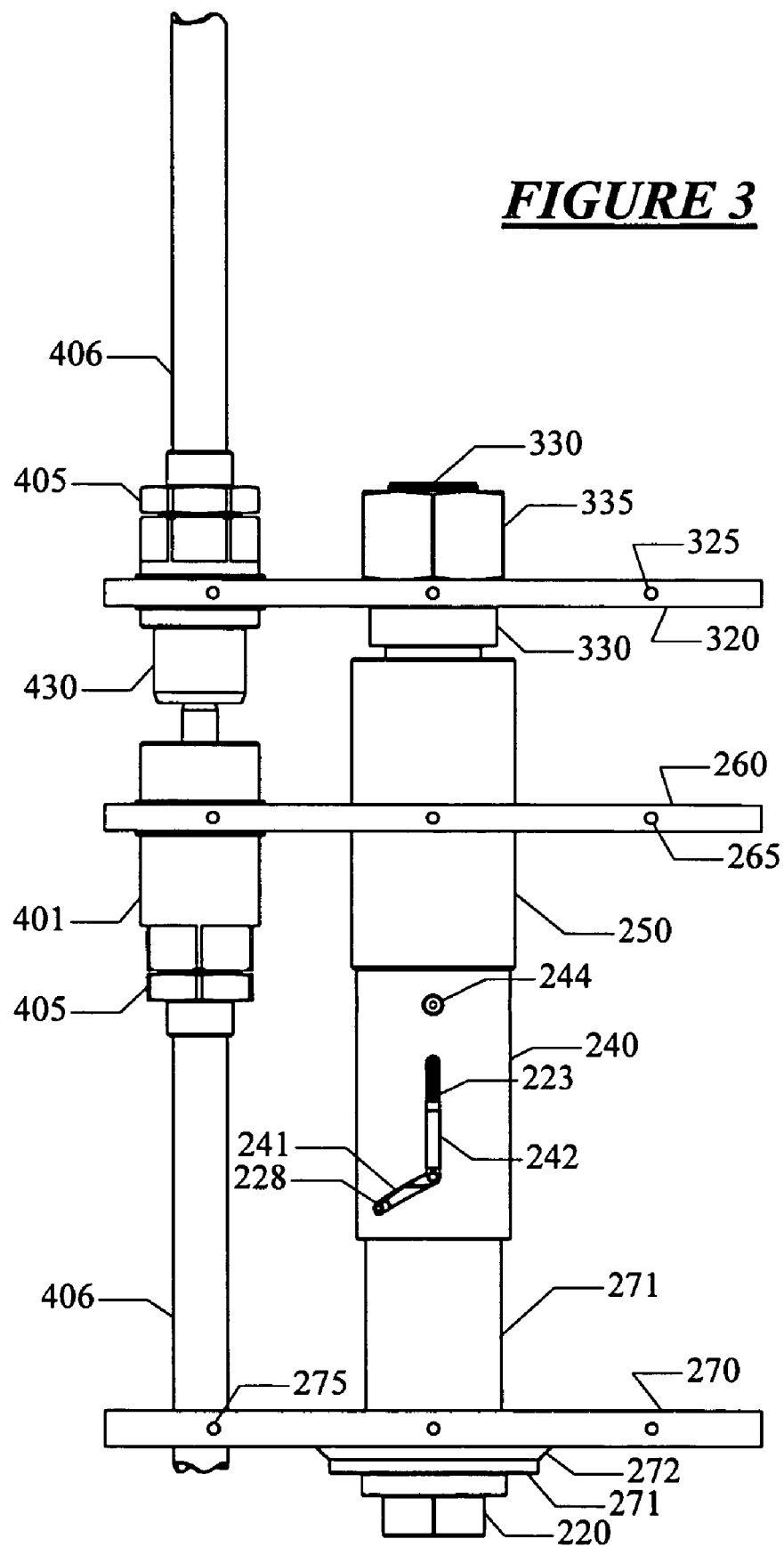
FIG. 3 is a profile view of one comateable set of a male and a female coupling in the interior of the removable and fixed connectors after the initial stabbing operation for the latching system has been made.
Figure 4:
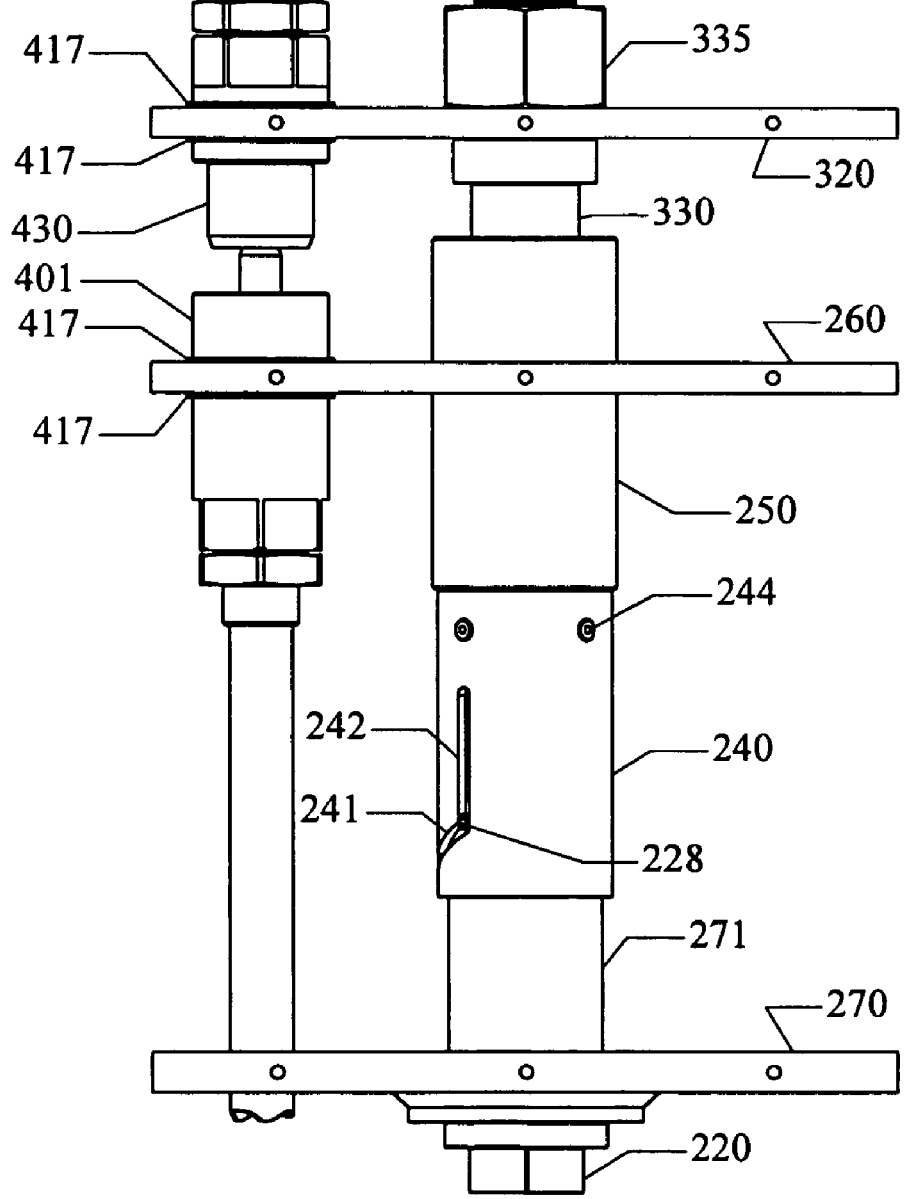
FIG. 4 is a view corresponding to FIG. 3, but with the latching mechanism actuated by sufficient axial reciprocation to rotate the latch sleeve so that the latch pin is entrapped.
Figure 9:
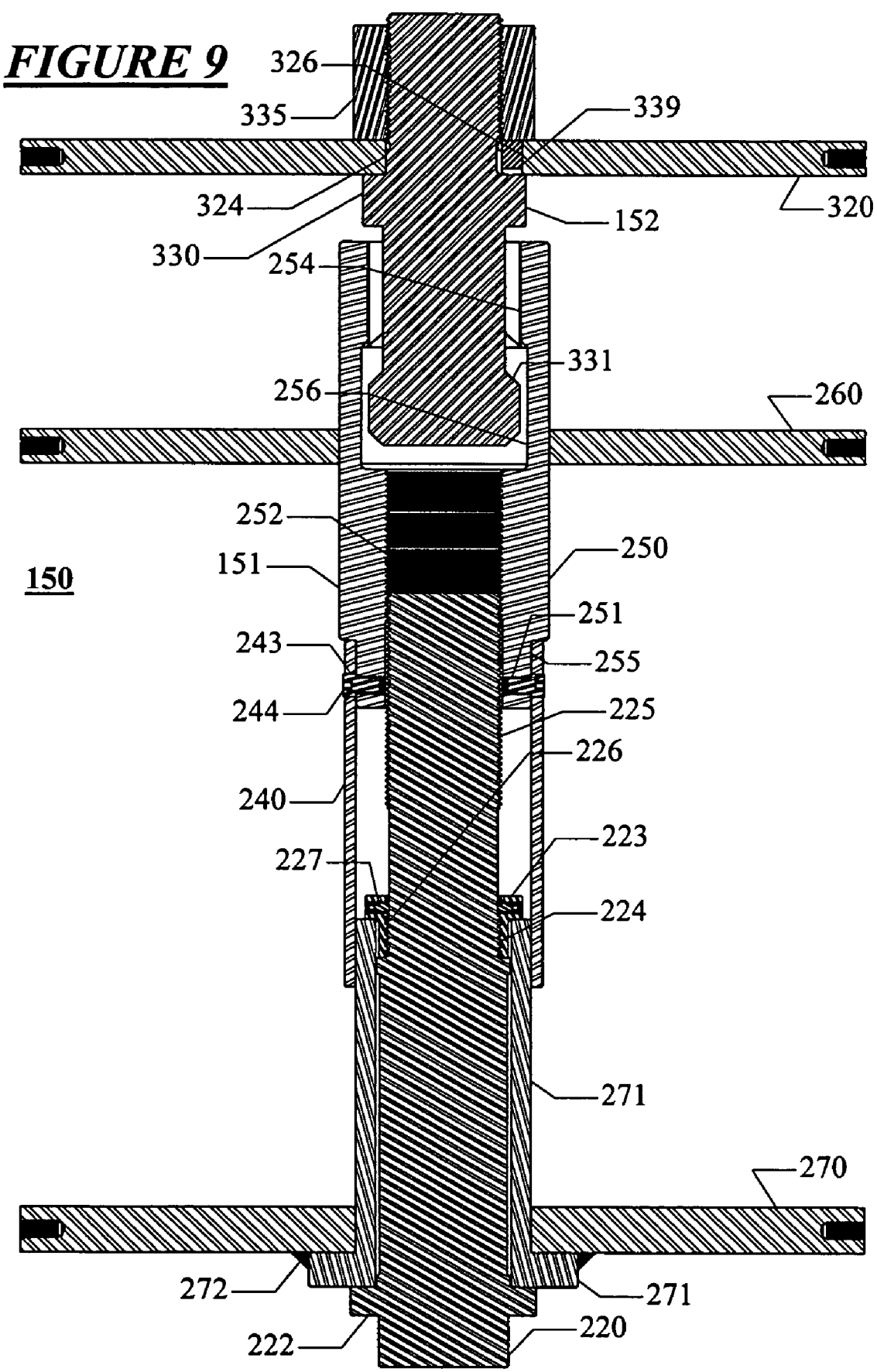
FIG. 9 is a longitudinal cross-sectional view of the internals of the fixed and removable connectors of FIG. 3.

In FIGS. 1, 3, and 9, the square removable end plate 260 of the preferred embodiment of the removable connector 200 is shown with a plurality of circular coupling mounting holes for installation of female couplers 401. The female couplings 401 are retained in the holes by means of external snap rings 417, as shown in FIG. 4. Holes are positioned in a regular pattern with closely held position tolerances.

Also shown is the central latch sleeve hole 263 for maintaining the position of the latch sleeve 250 on the axis of the removable connector 200. The end plate 260 has any number of mounting holes for any number of female couplings 401. The embodiment shown in FIG. 1 having twelve female couplings is meant by way of example and is not intended to limit the scope of the invention.

Removable transverse end plate 260 has a regular pattern of horizontal axis drilled and tapped holes 265 at its horizontal midplane corresponding to the countersunk holes at the upper end of housing 210 around its periphery. A flathead screw 205 extending through each of the transverse holes in the upper end of housing 210 and threadedly engaged in a mating hole 265 is used to rigidly mount removable transverse end plate 260 to housing 210.

FIGS. 2, 3, 9, and 12 show the square latch assembly mounting plate 270 of the preferred embodiment of the removable side latching components 151 with a plurality of circular clearance holes 278 for passage of each of the hydraulic tubes 406 used with the removable connector 200. Holes 278 are positioned in a regular pattern corresponding to that of the holes in the removable end plate 260. Centrally positioned on the axis of symmetry in the latch assembly mounting plate is the central latch sleeve support hole 279 for maintaining the position of the screw support sleeve 271 on the axis of the removable connector 200. Symmetrical transverse latch assembly mounting plate 270 has a slip fit in the interior of smaller tube section 213 of removable housing 210 and has a regular pattern of horizontal axis drilled and tapped holes 275 corresponding to those at the lower end of tube 213 around its periphery on its horizontal midplane. A flathead screw 205 extending through each of the transverse holes in the lower end of housing 213 and threadedly engaged in a mating hole 275 is used to rigidly mount latch assembly mounting plate 270 to housing 210.

Screw support sleeve 271 is a right circular cylindrical tube with a outwardly extending transverse flange at its lower end. Sleeve 271 is inserted from below through the latch sleeve support hole 279 in latch assembly mounting plate 270 so that the upper side of its flange abuts the underside of the plate 270. Fillet weld 272 around the upper periphery of the flange of sleeve 271 is used to rigidly mount the sleeve to the latch assembly mounting plate 270. Near the upper end of screw support sleeve is located a horizontal drilled and tapped radial camming pin hole 276. As shown here, the axis of the radial camming pin hole 276 is inclined 45 degrees to the vertical sides of the latch assembly mounting plate 270. Camming pin 228 has male threads at its inner first end, a smooth shank, and an Allen wrench pocket on its outer end. Camming pin 228 is threadedly engaged in the camming pin hole 276 after assembly of the camming sleeve 240 onto the screw support sleeve with its camming grooves 241 and 242 positioned over the camming pin hole 276.

Figure 10:
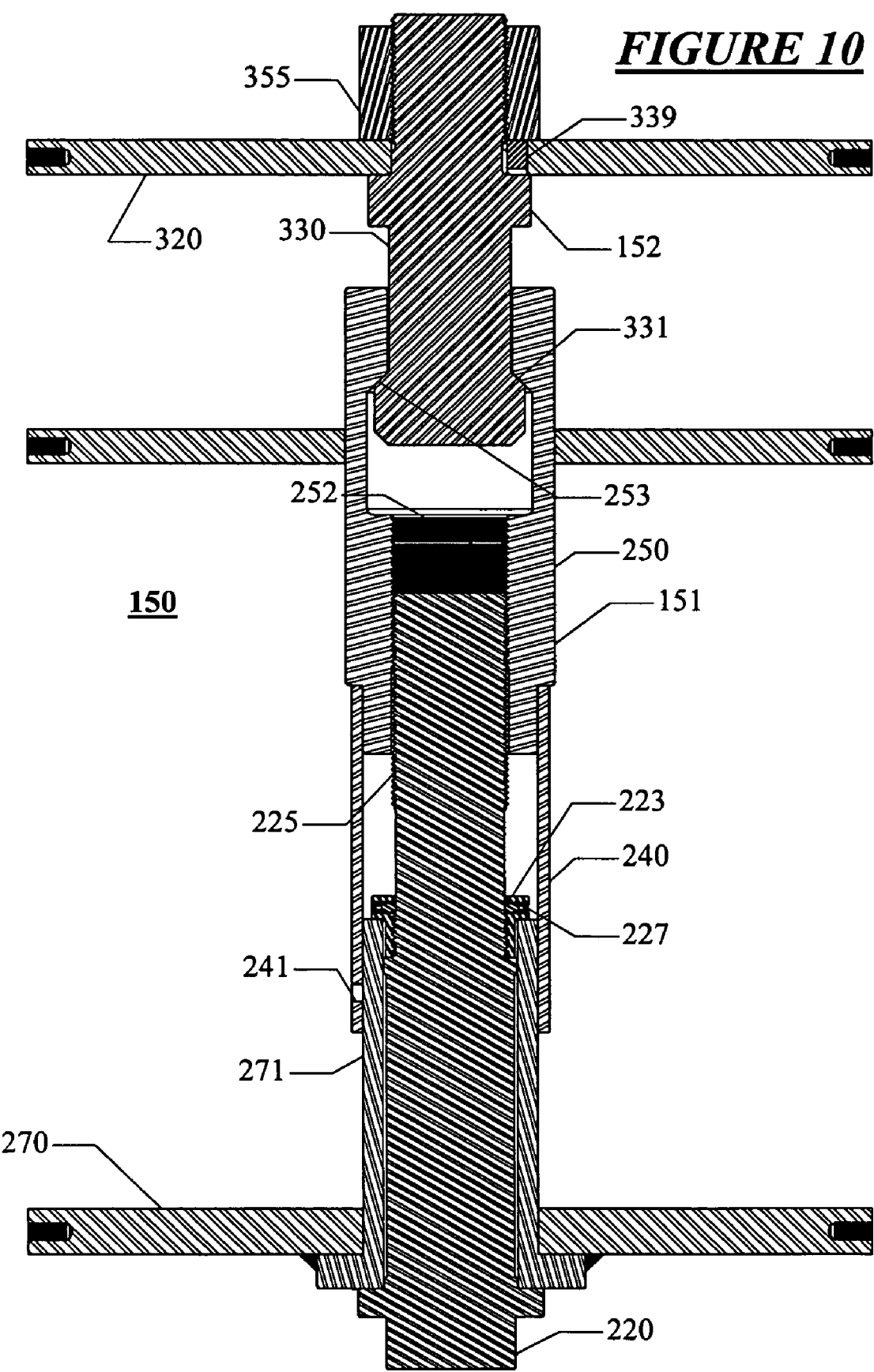
FIG. 10 is a longitudinal cross-sectional view of the internals of the fixed and removable connectors of FIG. 4.
Figure 11:
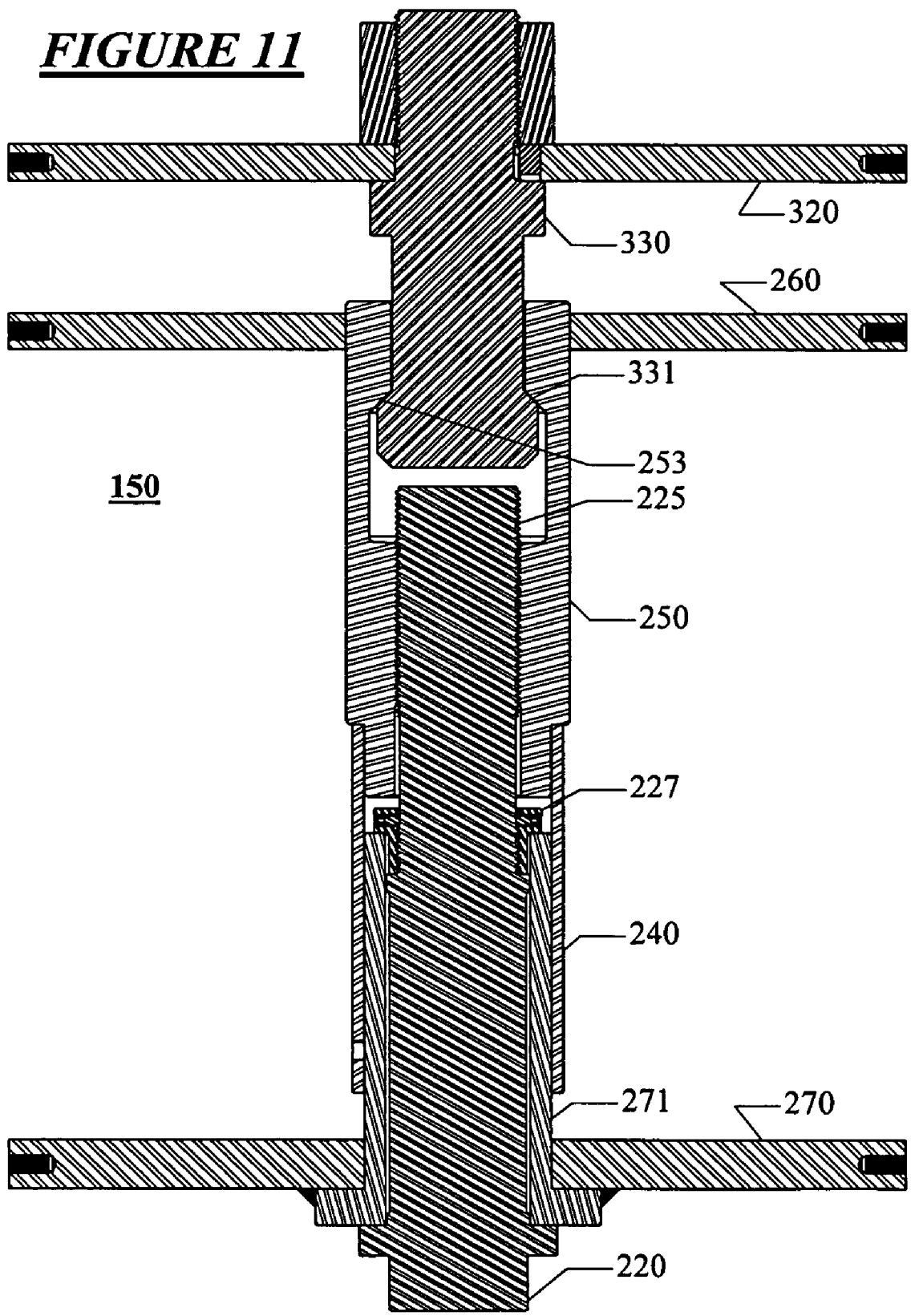
FIG. 11 is a longitudinal cross-sectional view of the internals of the fixed and removable connectors of FIG. 5.
Figure 12:
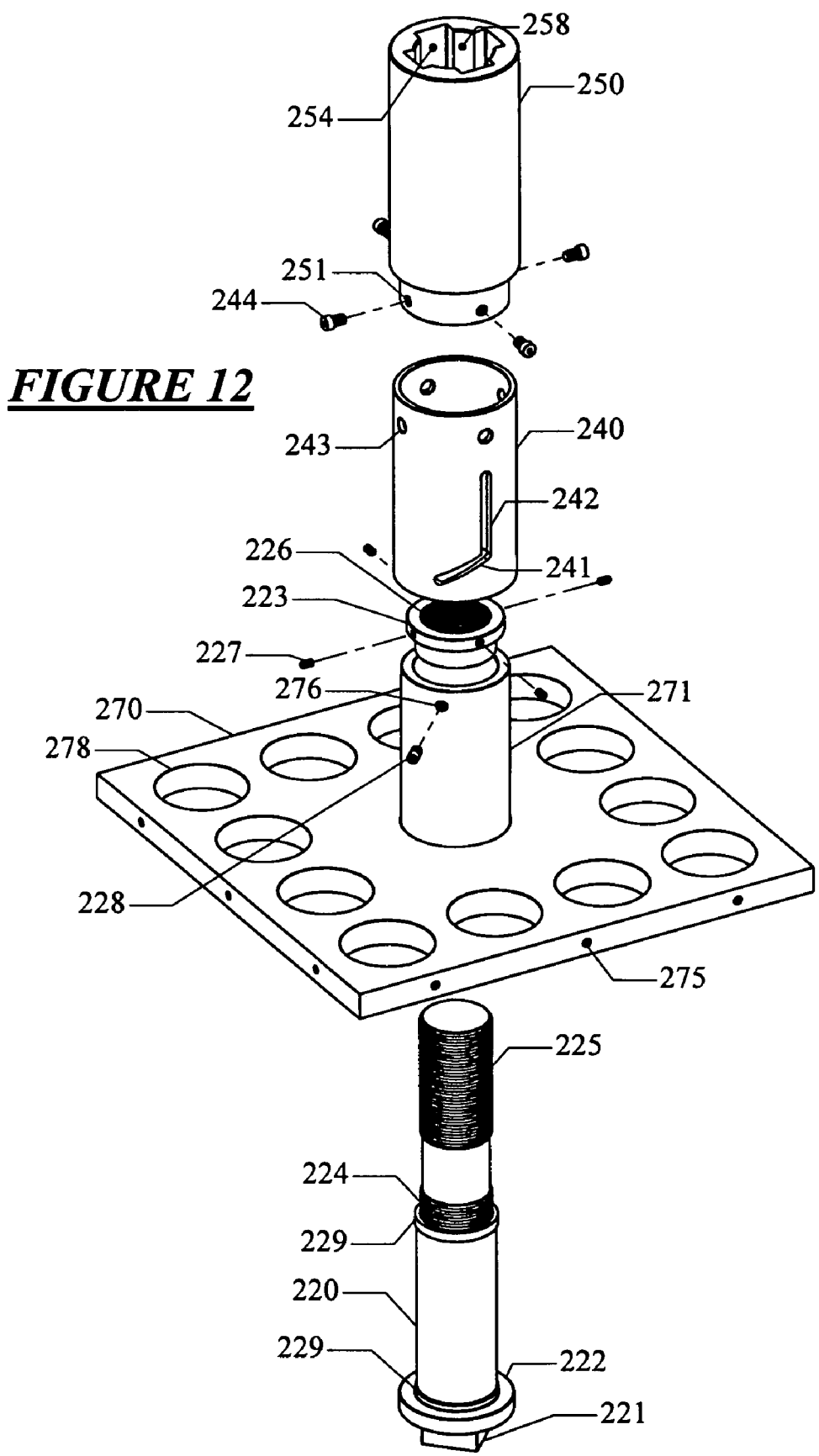
FIG. 12 is an oblique exploded view of the internal elements of the removable connector.

FIGS. 9, 10, and 11 show the installed drive screw 220 in section, while FIG. 12 shows an oblique view of the drive screw. An industry-standard square profile 221 forms the wrench flats 221 at the bottom of the drive screw 220 for engagement by a wrenching device, such as a ROV torque tool, during the latching operation. Immediately above the wrench flats 221 is a transverse right circular cylindrical flange shoulder 222 that abuts the flange of the screw support sleeve 271 when the drive screw is inserted into the bore of the sleeve 271.

The upwardly extending round shaft of the drive screw has, from the upper side of the shoulder 222, a bearing surface 229 which is a slip fit to the through bore of the screw support sleeve 271, an extended undercut cylindrical shank, another bearing surface 229, a small transverse shoulder, slightly reduced diameter lefthand threads 224 for engagement of the keeper sleeve 223, a reduced diameter extended thread relief groove, and an extended section of righthand threads 225 for engaging the latch sleeve 250. The diameter of the righthand threads 225 is less than that of the lefthand threads 224.

The keeper sleeve 223 is a short right circular cylindrical tube having lefthand internal threads 226, a short transverse upper flange, and multiple tapped radial set screw holes at the midheight of the upper flange. The lefthand internal threads 226 are comateable with the threads 224 of the drive screw 220. At assembly of the removable side latching components 151, drive screw 220 is inserted through the bore of the screw support sleeve 271 from below and then keeper sleeve 223 screwed onto the lefthand threads 224 so that the lower transverse shoulder of the keeper sleeve abuts the upper transverse end of the screw support sleeve 271. Allen head set screws 227 are installed in the radial set screw holes of the keeper sleeve 223 and are screwed in at assembly to abut the cylindrical surface of the long thread relief of the drive screw 220 and thereby prevent relative movement of the keeper sleeve 223 and the drive screw. In this manner drive screw 220 is axially restrained in both directions by the shoulder 222 on the bottom and the keeper sleeve 223 on the top.

The camming sleeve 240, shown best in FIG. 12, is a right circular cylindrical tube containing multiple radial holes 243 adjacent its upper end for connection to the latch sleeve 250 by shearable threaded pins 244. The bore of the camming sleeve 240 is a slip fit to both the upper exterior of the screw support sleeve 271 and the reduced diameter lower end 255 of the latch sleeve 250.

Near the lower end of camming sleeve 240 is a high pitch radially cut helical rotation groove 241. In plan view, the angle between the start and finish of the helical rotation groove 241 is about 45 degrees. At its upper end, groove 241 smoothly intersects radially cut axially extending axial travel groove 242, which is centrally located in the length of the sleeve 240. When assembled over the upwardly extending screw support sleeve 271, the two intersecting camming reaction grooves 241 and 242 of camming sleeve 240 are engageable by the camming pin 228 projecting outwardly from the outer surface of the screw support sleeve 271. Together, the interaction of pin 228 with the intersecting grooves 241 and 242 limit the range of rotational motion of the camming sleeve 240 and its attached latch sleeve 250 about the vertical axis of the rigidly mounted screw support sleeve 271 to about forty-five degrees while in the first groove 241, while allowing only axial reciprocatory movement of the camming sleeve and latch sleeve relative to the removable connector 200.

FIG. 12 shows an oblique view, while FIGS. 14 and 15 respectively show end and longitudinal cross-sectional views of the latch sleeve 250. Latch sleeve 250 is composed of integral right circular cylindrical tubular sections. When mounted in its operating position as shown in FIG. 2, the upper exterior cylindrical surface of latch sleeve 250 is a sliding fit to the center mounting hole 263 of the removable end plate 260. At the lower exterior end of latch sleeve 250, reduced diameter lower end 255 is located, with a transverse shoulder adjoining lower end 255 and the main body of the sleeve. Reduced diameter lower end 255 is a close slip fit to the upper interior end of the camming sleeve 240. Multiple radial drilled and tapped holes 251 are positioned adjacent the lower end of latch sleeve 250 in a pattern matching the holes 243 of the camming sleeve 240 when the upper end of the camming sleeve is abutted against the downwardly facing transverse shoulder at the upper end of the reduced diameter lower end 255. At assembly, the vertical plane of the camming sleeve 240 which contains both its axial travel groove 242 and its longitudinal axis is aligned with the vertical plane of symmetry of the female splines or clearance slots 254 of the latch sleeve 250.

From its lower end, as seen in FIG. 15, the interior of latch sleeve 250 has a section of unthreaded axial hole 257, righthand internal threads 252, an upwardly facing internal shoulder, an enlarged internal cavity 256, a downwardly facing frustroconical latching shoulder 253, and a clearance hole 258 which is a slip fit to the shank of the latch pin 330. The unthreaded axial hole 257 freely passes threads 225 of the drive screw 220, while the threads 252 are engageable with the threads 225. The interior diameter of the cavity 256 has a slip fit with the outer cylindrical surface of the male splines or latch dogs 331 of the latch pin 330 of the fixed side latching components 152. The latching shoulder 253 is closely engageable with the comateable upwardly facing frustroconical surfaces of the latch dogs 331 of the latch pin 330.

As shown in FIG. 14, multiple identical regularly spaced axially extending rectangular profile slots 254 extend from the upper end to the cavity 256 of the latch sleeve 250. The width of the female splines or clearance slots 254 is larger than the width of the male splines or latch dogs 331 of the latch pin 330. The outer wall of the slots 254 extends to the diameter of the cavity 256 and hence offers a loose clearance for the passage of the latch dogs 331, while the clearance hole 258 for the shank of latch pin 330 permits passage of the main cylindrical body of the latch pin. Accordingly, when the male splines or latch dogs 331 are aligned with the female splines or slots 254, the latch pin 330 can enter the cavity 256 of the latch sleeve 250. After entry of pin 330 into the cavity 256, sufficient axial rotation of the latch sleeve 250 relative to the latch pin can prevent withdrawal of the latch pin. When the latch sleeve 250 is rotated 45 degrees relative to its stabbing position, the latch dogs 331 are at their maximum misalignment with the slots 254 of the latch sleeve. The connection 100 may be drawn together safely when this rotation has been achieved.

Note that adjusting the length of the cavity 256 and the length of the latch pin 330 can limit the relative axial travel during initial stabbing of the removable connector 200 and the fixed connector 300. In such a case, the lower end of the latch pin would abut the upwardly facing shoulder at the lower end of the cavity 256. Use of such abutment can prevent communication between the male 430 and female 401 side of the coupling sets 400 until the removable side latching components 151 and the fixed side latching components 152 are filly latched.

Fixed Side Latching Components 152

Figure 8:
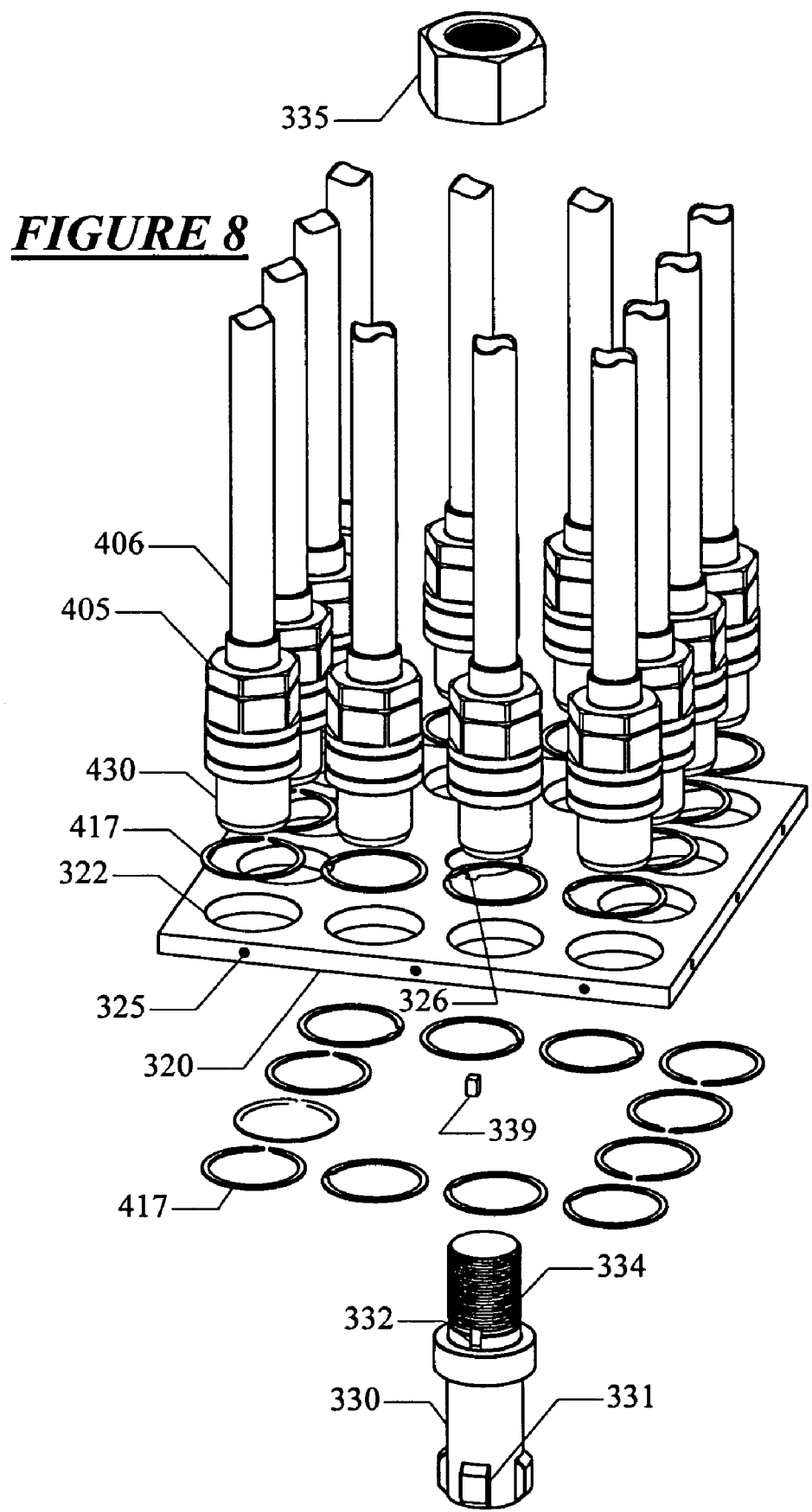
FIG. 8 is an oblique exploded view of the internal elements of the fixed connector.

The square fixed end plate 320 of the preferred embodiment of the fixed connector 300 is shown with a plurality of circular coupling mounting holes 322 for installation of male couplers 430, as shown in the exploded view of FIG. 8. The male couplings 430 are retained in the holes 322 by means of external snap rings 417, as shown in FIGS. 6 and 7.

Holes 322 are positioned in a regular pattern with closely held position tolerances, with the hole pattern the same as the pattern of holes in the removable end plate 260. The configuration of the end plate 320 having mounting holes 322 for twelve male couplings 430 is meant by way of example and is not intended to limit the scope of the invention. Also shown is the central hole 324 for mounting the downwardly extending latch pin 330. A rectangular cross-section keyway 326 is cut in a radial position on the edge of central hole 324.

Fixed transverse end plate 320 has a regular pattern of horizontal axis drilled and tapped holes 325 at its horizontal midplane corresponding to the countersunk holes at the upper end of housing 310 around its periphery. A flathead screw 205 extending through each of the transverse countersunk holes in the upper end of housing 310 and threadedly engaged in a mating hole 325 is used to rigidly mount fixed transverse end plate 320 to housing 310.

Latch pin 330, shown in FIG. 8, is composed of integral generally right circular cylindrical segments. From its upper end, latch pin 330 has a male thread 334, a thread relief in which a rectangular cross-section keyway 332 is cut, a central flange with transverse upper shoulder, and an extended cylindrical shank that has multiple equispaced discrete radially outwardly extending latch dogs 331. The upper and lower sides of each latch dog 331 are segments of frustroconical transition shoulders, while the lateral sides of each individual latch dog are parallel and equally offset from the longitudinal axis of the latch pin 330.

A rectangular cross-section key 339 is installed in the keyway of the latch pin 330 and the latch pin with its key are installed in the central hole 324 of the fixed transverse end plate 320 from below so that the key is also engaged with the keyway 326 of the end plate. In this manner, the latch pin 330 is prevented from rotation relative to the end plate 320 and, hence, also the fixed connector 300. Note that the orientation of the keyways 326 and 332 are necessarily controlled so that the planes of symmetry of the latch dogs 331 of the installed latch pin 330 are parallel to the transverse sides of the fixed end plate 320. Internally threaded hex nut 335 is then threadedly connected to the threads 334 at the upper end of the latch pin 330 to fully rigidize the connection between the latch pin and the fixed end plate 320.

OPERATION OF THE INVENTION

Prior to the use, the removable connector 200 is assembled as shown in FIG. 2. This involves structurally connecting (usually by welding although other methods are acceptable) the parts of the removable housing 210 (the large tube 211, the frustrated pyramidal reducing tube 212 and the small tube 213) if such connections have not been done previously at manufacture, mounting the female couplings 401 (such as those manufactured by National Coupler) on the removable end plate 260, and attaching the removable end plate 260 to the upper end of the removable housing 210. Assembly continues with connecting the camming sleeve 240 and latch sleeve 250 with shearable camming sleeve mounting screws 244 in holes 243 and 251, slipping the slotted sleeve 240 over the screw support sleeve, and bolting the guide tube 230 to the mounting flange 216 of the removable housing 210. Assembly of the removable connector is completed by inserting the drive screw 220 into the downwardly facing end of the latch sleeve 250 and rotating the drive screw 220 such that its external righthand threads 225 fully engage with the internal threads 252 of the latch sleeve 250 as shown in FIGS. 3 and 9.

During transport of the assembled removable connector 200 to the installation location, all sensitive components of the removable connector are inside of and, therefore, protected by the heavy-duty removable housing 210. If the installation is to be subsea, then the stabbing together of the fixed and removable connectors is done in an inverted position from that shown in the drawings for the present disclosure. In such a case, when the installation site is reached, an ROV (not shown) maneuvers the removable connector 200 of the preferred embodiment such that the top (in the drawings) of the removable connector 200 enters the bottom of the fixed connector 300. The use of an ROV is meant by way of example and is not meant to limit the scope of the invention. A diver, for instance, could perform the operation instead of an ROV.

Figure 13:
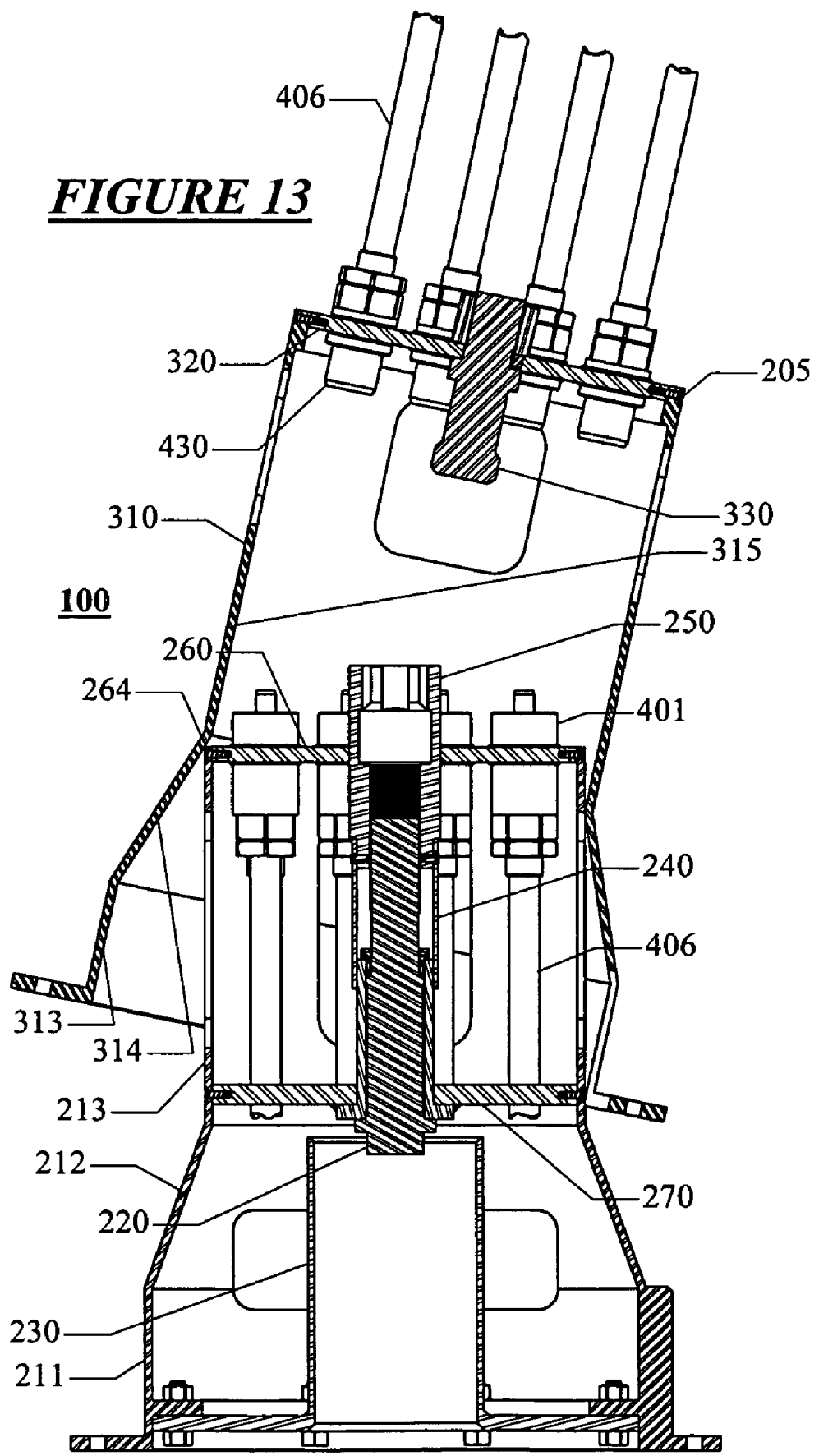
FIG. 13 is a longitudinal cross-sectional view of fixed and removable sides of the connection in a state of axial misalignment during initial stabbing to effect the connection.

As shown in FIG. 13, a high degree of coarse, angular alignment of the connector system 100 is provided by taking advantage of the natural alignment properties of the geometrically similar housings 210 and 310 of the removable and fixed connectors 200 and 300, respectively. The removable connector 200 is inserted into the fixed connector 300, resulting in initial rotational and axial alignment of the connectors 200 and 300. Although the subsea connector system 100 is designed for any orientation, the following discussion relates to a vertical ROV installation for ease of understanding and is not meant to limit the scope of the invention.

FIG. 13 shows a typical vertical alignment operation where the initial alignment of the removable connector 200 into the fixed connector 300 is very skewed. Each external transverse edge of the top of the housing 210 has a radius 264 to prevent that edge from gouging or otherwise seizing in the interior of connector body 310 during stabbing. These rounded corners and the sloping sides of the frustrated pyramidal reducing tube 314 in the fixed housing 310 facilitate the self-correcting behavior of the alignment process. The rounded corners of the removable housing 210 tend to slide down the interior surface of the fixed housing 310, thereby increasing the alignment forces and assisting in the alignment process.

The latch pin 330 is specially designed to be instrumental in the latching process but also assists in the fine alignment process that mates the male and female couplers 401 and 430. The latch sleeve 250 has internal slots 254 for receiving the latch dogs 331 of the latch pin 330. As the ROV pushes the removable connector 200 further into the fixed connector 300, the dogs 331 slip through the slots 254 and the shank of the latch pin through the clearance hole 258 of the latch sleeve 250 and are guided upward in preparation for the final alignment of the comateable male and female couplers 430 and 401.

During the latching operation, the latching system 150 must forcibly pull the removable connector 200 and the fixed connector 300 together to overcome a separation force generated by any internal pressure within the female couplings 401 and/or male couplings 430. After the coarse alignment of the removable connector 200 into the fixed connector 300 (as described above), the latching process is performed. First, the removable connector 200 is pushed into the fixed connector 300 by the ROV until the latch pin 330 has fully entered the latch sleeve 250 of the removable connector 200. FIGS. 3 and 9 show the positions of the components of the latching system 150 at the initially stabbed position for the latching system. An industry-standard wrenching device, such as a torque tool, engages the industry-standard square profile 221 on the exposed end of the drive screw 220.

As the torque tool rotates the drive screw 220, the latch sleeve 250 is drawn towards the latch assembly end plate 270 and is forced to rotate forty-five degrees by the reaction of the camming pin 228 in the helical rotation groove 241. The resultant forty-five degree rotation during this reciprocation of the latch sleeve 250 aligns the latch dogs 331 with the latching shoulders 253. Further reciprocation due to additional engagement of drive screw 220 into the threads 252 of the latch sleeve 250, along with attendant alignment of the camming pin into the axial travel groove 242, causes the upper partial frustroconical faces of the latch dogs 331 of the latch pin 330 to begin to abut on the partial frustroconical latching shoulders 253 of the latch sleeve 250. The positions of the components of the latching system 150 in this situation are shown in FIGS. 4 and 10. At this point the entrapment of the removable connector 200 by the fixed connector can be increased by means of screwing drive screw 220 farther into latch sleeve 250. Fine rotational and angular alignment is provided as the small removable tube 213 with parallel sides engages the parallel sides of the small fixed tube 315.

As described above, internal threads 252 of the latch sleeve 250 are permanently engaged with external threads 225 on the drive screw 220. Therefore, the final rotation of the drive screw 220 results in the removable connector 300 moving into the fixed connector 200, thereby compelling the female connector poppet 403 and the male connector poppet 432 to overcome their respective bias springs 418 and 438 so that the couplings 400 are in their open flowing condition shown in FIG. 7.

Figure 5:
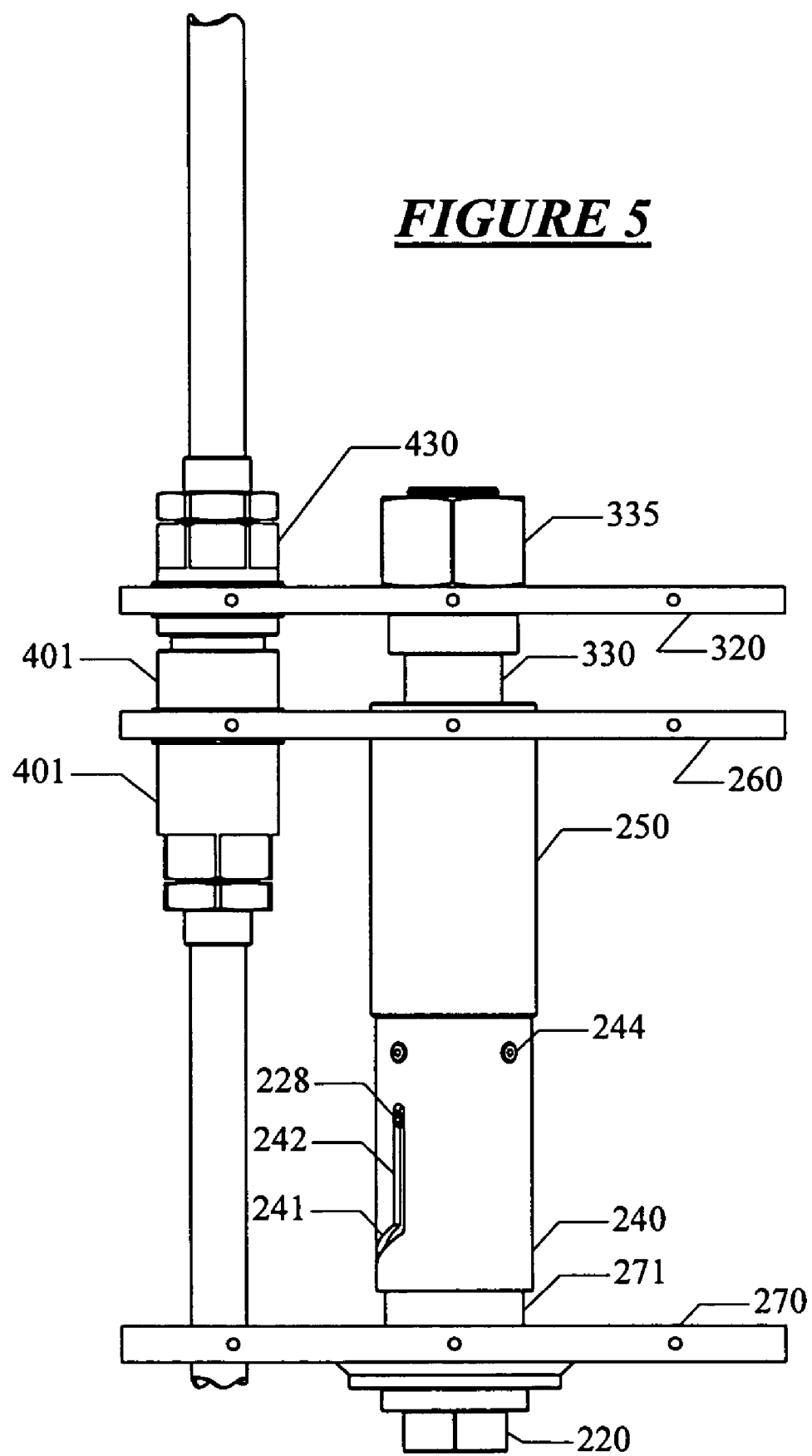
FIG. 5 is a view corresponding to FIGS. 3 and 4, but with the latching mechanism fully actuated by axial reciprocation to rigidly engage the latch sleeve with the latch pin, wherein the axial reciprocation of the latch sleeve simultaneously opens the male and female hydraulic couplings as the latch sleeve and the latch pin are drawn together.

FIG. 2 shows the subsea connector system 100 after the latch pin 330 is fully latched within the latch sleeve 250 and the hydraulic couplings 400 fully connected. FIGS. 5 and 11 correspond to the condition of the latching system 150 in this fully latched position.

In the event of thread galling or seizing, the latching system 150 can be over-ridden by using the drive screw 220 to apply excessive torque. This causes the shearable camming sleeve mounting screws 244 mounted in holes 242 and 251 to rupture at the interface of camming sleeve 240 and latch sleeve 250, thereby releasing the camming sleeve 240 from the latch sleeve 250. The latch sleeve 250 can then be rotated forty-five degrees due to the assumed bound or galled condition between the drive screw 220 and the latch sleeve 250. After rotating forty-five degrees, the removable connector 200 must be forced away from the fixed connector 300 to overcome any vacuum created within the couplings 401 and 430 after their poppets seat.

Although the invention has been described in terms of certain preferred embodiments, it will be apparent to those of ordinary skill in the art that modifications and improvements can be made to the inventive concepts herein without departing from the scope of the invention. For instance, various sizes and types of couplings 400 can be used at the same time, and electrical and fiber optic connections also coupled. Furthermore, the transverse cross-sections of the removable and fixed housings can have polygonal shapes other than the squares shown herein. Hydraulic couplings, which are flush-faced, can also be utilized. The embodiments shown herein are merely illustrative of the inventive concepts and should not be interpreted as limiting the scope of the invention.

ADVANTAGES OF THE INVENTION

The present invention provides several advantages over prior products. The couplings and the latch mechanism are very well protected by virtue of being fully encloseable for the fixed connector and largely enclosed for the removable connector. A very significant advantage is that the operating threads of the latching mechanism are always fully engaged, thereby protecting them from inadvertent damage and avoiding the very problematic stabbing of threaded connections by robotic installation means. The geometry of the present invention is readily changed so that a variety of types and numbers of couplings can be utilized with the same latching mechanism. The self-aligning characteristics of the interacting fixed and removable housings particularly ease robotic assembly of the connectors. The ability to release the connectors by applying overtorque to shear the connection between the camming sleeve and the latch sleeve in the event of malfunction of the conventional release means is particularly necessary for subsea connections. These and other advantages combine to make this novel connector particularly desirable for subsea and other robotic use.

What is claimed is:

1. A subsea connector system comprising:
    (a) a first connector having a first housing connected to a first end plate, wherein a first set of couplers are mounted on the first end plate;
    (b) a second connector having a second housing connected to a second end plate, wherein a second set of couplers, comateable with the first set of couplers, are mounted on the second end plate,
    wherein the configuration of the first housing and the second housing include:
    a large tube having four flat rectangular sides, wherein the opposite sides are parallel to each other, a small tube having four flat rectangular sides, wherein the opposite sides are parallel to each other, and an interconnecting tube having four flat trapezoidal-shaped sides, wherein the sides of the interconnecting tube connects the sides of the large tube to the sides of the small tube, whereby the first or second housing is nestable within the other housing when properly aligned; and
    (c) a latching system including
    a latch sleeve having a plurality of female splines attached to the first connector, and
    a latch pin having a plurality of male splines attached to the second connector;
    wherein the interaction of the latch sleeve and the latch pin induce the engagement of the first and second connectors.

2. The subsea connector system of claim 1, wherein the first connector is a fixed connector and the second connector is a removable connector.

3. The subsea connector system of claim 2, wherein the first set of couplers are protected against damage by the first housing and the second set of couplers is partially protected against damage by the second housing.

4. The subsea connector system of claim 1, wherein the second connector is a fixed connector and the first connector is a removable connector.

5. The subsea connector system of claim 1, wherein the couplers in the first set of couplers have a male configuration and the couplers in the second set of couplers have a female configuration.

6. The subsea connector system of claim 1, wherein the first connector is a fixed connector and the second connector is a removable connector and the first connector is nested within the second connector when the subsea connector system is engaged.

7. The subsea connector system of claim 6, wherein each transverse exterior edge of a side of the first end plate is radiused.

8. A subsea connector system comprising:
    (a) a first connector having a first housing connected to a first end plate, wherein a first set of couplers are mounted on the first end plate, wherein the first connector housing has a first right prismatic cross-section, a first transition section, and a second right prismatic cross-section similar in shape to the first cross-section but larger than the first cross-section, wherein the cross-section of the first connector housing smoothly and monotonically increases in the first transition from the first cross-section to the second cross-section;

(b) a second connector having a second housing connected to a second end plate, wherein a second set of couplers, comateable with the first set of couplers, are mounted on the second end plate, wherein the second connector housing has a proximal right prismatic cross-section, a second transition section, and a distal right prismatic cross-section similar in shape to the first cross-section but smaller than the proximal cross-section, wherein the cross-section of the second connector housing smoothly and monotonically decreases in the second transition section from the proximal cross-section to the distal cross-section and wherein the first connector is engageable in an interior of the second connector by relative axial translation such that all lateral sides of the first connector housing are equispaced from all adjacent lateral sides of the second connector housing when the first connector is positioned in the interior of the second connector; and (c) a latching system including
a latch sleeve having a plurality of female splines attached to the first connector, and
a latch pin having a plurality of male splines attached to the second connector;
wherein the interaction of the latch sleeve and the latch pin induce the engagement of the first and second connectors.

9. A subsea connector system comprising:
(a) a first connector having a first housing connected to a first end plate, wherein a first set of couplers are mounted on the first end plate;
(b) a second connector having a second housing connected to a second end plate, wherein a second set of couplers, comateable with the first set of couplers, are mounted on the second end plate; and
(c) a latching system including
  (i) a latch pin attached to the second connector having
    a plurality of male splines positioned on a proximal end of the latch pin, wherein the male splines extend a spline length,
    a cylindrical shaft positioned on a distal end of the latch pin, wherein the shaft has a diameter smaller than the external diameter of the male splines and a shaft length that is longer than the spline length, and
    a set of latch pin shoulders wherein each latch pin shoulder transitions from one male spline to the cylindrical shaft, and
  (ii) a latch sleeve attached to the first connector having
    a plurality of female splines positioned on a proximal end of the latch sleeve, wherein the female splines have a length similar to the spline length of the male splines and are coengageable with the male splines of the latch pin,
    a cylindrical counterbore positioned on a distal end of the latch sleeve, the counterbore having a diameter larger than the external diameter of the male splines and a counterbore length longer than the spline length, wherein the counterbore has a threaded segment at a counterbore distal end, and
    a set of latch sleeve shoulders comateable with the latch pin shoulders, wherein each latch sleeve shoulder transitions from one female spline to the counterbore;
wherein the interaction of the latch sleeve and the latch pin induce the engagement of the first and second connectors.

10. The subsea connector system of claim 9, wherein the latch sleeve is able to rotate about and translate along the longitudinal axis of the first connector and the latch pin is mounted on the longitudinal axis of the second connector.

11. The subsea connector system of claim 9, the latching system further including a camming mechanism comprising:
(a) a camming sleeve having a helical slot and a cojoined second slot parallel to a camming sleeve axis; and
(b) a stationary pin mounted on the first connector and engageable with the helical slot or the second slot.

12. The subsea connector system of claim 11, wherein the camming sleeve is coaxially joined with the latch sleeve.

13. The subsea connector system of claim 12, wherein the camming sleeve is joined with the latch sleeve by a shearable mechanism.

14. The subsea connector system of claim 9, further comprising a drive screw having a threaded segment threadedly engaged with the threaded segment of the latch sleeve counterbore.

15. A connector system comprising:
(a) a first connector having a first housing connected to a first end plate, wherein a first set of couplers are mounted on the first end plate;
(b) a second connector having a second housing connected to a second end plate, wherein a second set of couplers, comateable with the first set of couplers, are mounted on the second end plate; and
(c) a latching system including
  (i) a latch pin attached to the second connector having
    a plurality of male splines positioned on a proximal end of the latch pin, wherein the male splines extend a spline length,
    a cylindrical shaft positioned on a distal end of the latch pin, wherein the shaft has a diameter smaller than the external diameter of the male splines and a shaft length that is longer than the spline length, and
    a set of latch pin shoulders wherein each latch pin shoulder transitions from one male spline to the cylindrical shaft, and
  (ii) a latch sleeve attached to the first connector having
    a plurality of female splines positioned on a proximal end of the latch sleeve, wherein the female splines have a length similar to the spline length of the male splines and are coengageable with the male splines of the latch pin,
    a cylindrical counterbore positioned on a distal end of the latch sleeve, the counterbore having a diameter larger than the external diameter of the male splines and a counterbore length longer than the spline length, wherein the counterbore has a threaded segment at a counterbore distal end, and
    a set of latch sleeve shoulders comateable with the latch pin shoulders, wherein each latch sleeve shoulder transitions from one female spline to the counterbore, and
  (iii) a camming mechanism comprising a camming sleeve with a helical slot and a cojoined second slot parallel to a camming sleeve axis and a stationary pin mounted on the first connector;

wherein the interaction of the latch sleeve and the latch pin induce the engagement of the first and second connectors.

16. A method of aligning and engaging subsea connectors comprising the steps of:

obtaining a male tubular connector with a first connector housing having a first right prismatic cross-section, a first transition section, and a second right prismatic cross-section similar in shape to the first cross-section but larger than the first cross-section, wherein the cross-section of the first connector housing smoothly and monotonically increases in the first transition from the first cross-section to the second cross-section;

obtaining a female tubular connector with a second connector housing having a proximal right prismatic cross-section, a second transition section, and a distal right prismatic cross-section similar in shape to the first cross-section but smaller than the proximal cross-section, wherein the cross-section of the second connector housing smoothly and monotonically decreases in the second transition section from the proximal cross-section to the distal cross-section;

moving the male tubular connector toward the female tubular connector;

bringing the first cross-section of the male tubular connector into approximate axial alignment with the proximal cross-section of the female tubular connector;

pushing the first cross-section of the male tubular connector into the proximal cross-section of the female tubular connector such that the abutment of an exterior end of the first cross-section with an interior of the second transition section of the female connector induces the first prismatic cross-section of the male tubular connector to align with the distal right prismatic cross-section of the female tubular connector; and continuing moving the male and female tubular connectors toward each other until the male connector is fully entered into an interior of the female connector such that all lateral sides of the first connector housing are substantially equispaced from all adjacent lateral sides of the second connector housing.

17. A method for engaging subsea connectors comprising the steps of:

(a) obtaining a subsea connector system comprising:

a first connector having a first housing connected to a first end plate, wherein a first set of couplers are mounted on the first end plate;

a second connector having a second housing connected to a second end plate, wherein a second set of couplers, comateable with the first set of couplers, are mounted on the second end plate; and a latching system including (i) a latch pin attached to the second connector having
a plurality of male splines positioned on a proximal end of the latch pin, wherein the male splines extend a spline length,
a cylindrical shaft positioned on a distal end of the latch pin, wherein the shaft has a diameter smaller than the external diameter of the male splines and a shaft length that is longer than the spline length, and
a set of latch pin shoulders wherein each latch pin shoulder transitions from one male spline to the cylindrical shaft, and (ii) a latch sleeve attached to the first connector having
a plurality of female splines positioned on a proximal end of the latch sleeve, wherein the female splines have a length similar to the spline length of the male splines and are coengageable with the male splines of the latch pin,
a cylindrical counterbore positioned on a distal end of the latch sleeve, the counterbore having a diameter larger than the external diameter of the male splines and a counterbore length longer than the spline length, wherein the counterbore has a threaded segment at a counterbore distal end, and
a set of latch sleeve shoulders comateable with the latch pin shoulders, wherein each latch sleeve shoulder transitions from one female spline to the counterbore;

(b) aligning the male and female splines such that an axial translatory movement of the latch sleeve relative to the latch pin causes the male and female splines to initially engage;

(c) moving the aligned latch sleeve and latch pin together such that the male splines move into the counterbore of the latch sleeve and the female splines are adjacent the cylindrical shaft of the latch pin;

(d) rotating the latch sleeve relative to the latch pin such that the male and female splines are misaligned and the shoulders of the latch pin abut the shoulders of the sleeve; and (e) drawing the first connector towards the second connector to connect the first and second set of couplings to form a plurality of sealed conduits.

* * * * *